United States Patent

Naumann et al.

[11] Patent Number: 5,561,242
[45] Date of Patent: Oct. 1, 1996

[54] APPARATUS FOR LOCATING WHEELSETS

[75] Inventors: Hans J. Naumann, Albany, N.Y.;
Reinhard Robotta, Erlau, Germany;
Gunter Schröter, Chemnitz, Germany;
Volker Thomas, Einsiedel, Germany

[73] Assignee: Niles-Simmons Industrieanlagen GmbH, Chemnitz, Germany

[21] Appl. No.: 418,409

[22] Filed: Apr. 7, 1995

[30] Foreign Application Priority Data

Apr. 8, 1994 [DE] Germany .......................... 44 12 074.5

[51] Int. Cl.$^6$ ............................... B23B 5/32; B23B 5/28
[52] U.S. Cl. .......................... 73/65.09; 82/1.11; 82/104;
82/124; 73/66; 73/65.01
[58] Field of Search ................................ 73/65.09, 65.01,
73/65.07, 66; 82/124, 1.11, 104, 105, 170,
903

[56] References Cited

U.S. PATENT DOCUMENTS

| | | | |
|---|---|---|---|
| 2,546,225 | 7/1959 | Julian et al. .............................. | 51/104 |
| 2,893,479 | 7/1959 | Sheridan et al. .......................... | 157/13 |
| 3,518,914 | 7/1970 | Dombrowski et al. ..................... | 82/8 |
| 3,667,329 | 6/1972 | Dombrowski et al. ..................... | 82/8 |
| 4,116,094 | 9/1978 | Dombrowski et al. ..................... | 82/8 |
| 4,347,769 | 9/1982 | Dombrowski et al. ..................... | 82/8 |
| 4,399,724 | 8/1983 | Dombrowski et al. ..................... | 82/8 |
| 4,674,369 | 6/1987 | Gutöhrlein et al. ........................ | 82/8 |
| 4,825,737 | 5/1989 | Heimann et al. .......................... | 82/124 |
| 4,939,962 | 7/1990 | Wittkopp et al. .......................... | 82/1.11 |

*Primary Examiner*—Hezron E. Williams
*Assistant Examiner*—J. David Wiggins
*Attorney, Agent, or Firm*—Howard J. Greenwald

[57] ABSTRACT

An apparatus for locating the center of rotation of a wheelset. The apparatus contains two movable roller assemblies each designed to establish circumferential contact with a wheel at a different location on the wheel periphery, a movable lifting device connected to each such roller assembly, encoders for determining the extent to which each of the movable roller assemblies is moved in a linear direction during rotation of the wheel of the wheelset while in contact with the wheel, and an encoder for determining the extent to which the wheel of such wheelset moves in the x and y axes axis during rotation of the wheel about its centrally mounted axes.

16 Claims, 2 Drawing Sheets

APPARATUS FOR LOCATING WHEELSETS

CROSS-REFERENCE TO RELATED PATENT APPLICATION

This application claims priority based upon prior German patent P 4410274.5-14 entitled "Process and device for locating wheelsets of railroad vehicles in the centre of rotation," which was filed in the German Patent Office on Apr. 8, 1994.

FIELD OF THE INVENTION

An apparatus for determining the center of rotation of the wheels of railroad vehicles.

BACKGROUND OF THE INVENTION

During operation the wheels of railroad rolling stock (such as locomotives and railroad cars) become worn. This wear often increases the risk of train derailment and, additionally, may accelerate wheel .wear or otherwise adversely affect the running characteristics of the wheels.

These wheels of railroad rolling stock may, with wear, develop flat areas on their circumferences. Such wear often causes a bumpy or vibratory rotation of the worn wheel against the rail. Additionally, such worn wheels may cause derailment of the railway vehicle.

It is thus critical to maintain railway wheelsets to attempt to avoid this condition and, where it occurs, to grind or machine the wheel's circumference so that it is once more perfectly round and concentric with the axial centerline of the wheel and the wheelset. Wheelset truing machines are often used to accomplish this end. These machines are well known to those skilled in the art and are described, e.g., in U.S. Pat. Nos. 4,825,737, 4,680,846, 4,276,793, 4,265,149, 4,200,012, 4,134,314, and the like. The disclosure of each of these United States patents is hereby incorporated by reference into this specification.

Most wheelset truing machines require that the wheelset be located in a centered position with respect to the machining device so that accurate concentricity between the wheel circumference and the axial centerline will be obtained. Additionally, once the machining operation has been completed, the wheelset must be located in a centered position in order to measure the accuracy of the machining.

Axle bearing boxes (bushings through which the axle passes in the hub of a wheel) are commonly located on both ends of the railway wheelset. See, e.g., U.S. Pat. Nos. 5,358,072, 5,237,933, 5,235,918, 5,213,049, 5,189,962, 4,527,487, 3,588,204, 3,531,166, and the like; the disclosure of each of these patents is hereby incorporated by reference into this specification.

One could remove these axle bearing boxes to locate the wheelset's true center; the axle of the wheelset, which runs true with the wheelset axial centerline, could then be used to locate the true center of the wheelset with a simple double roller centering device.

However, it is generally not desirable to remove the axle bearing boxes, even during truing operations, because of the possibility of contamination of the bearings and grease packed therebetween. Consequently, a measuring device which would allow the location of the wheelset's true center without requiring the removal of axle bearing boxes would be desirable.

It is an object of this invention to provide a measuring device adapted to locate a wheelset's true center without requiring the removal of axle bearing boxes.

SUMMARY OF THE INVENTION

In accordance with this invention, there is provided an apparatus for locating wheelsets of railroad vehicles in the center of rotation in a truing machine. The apparatus contains a first movable roller operatively connected to a first adjustable lifting device, a second movable roller operatively connected to a second adjustable lifting device, means for measuring the movements of said first and second adjustable lifting device, and means for controlling the movements of said first and second adjustable lifting devices.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
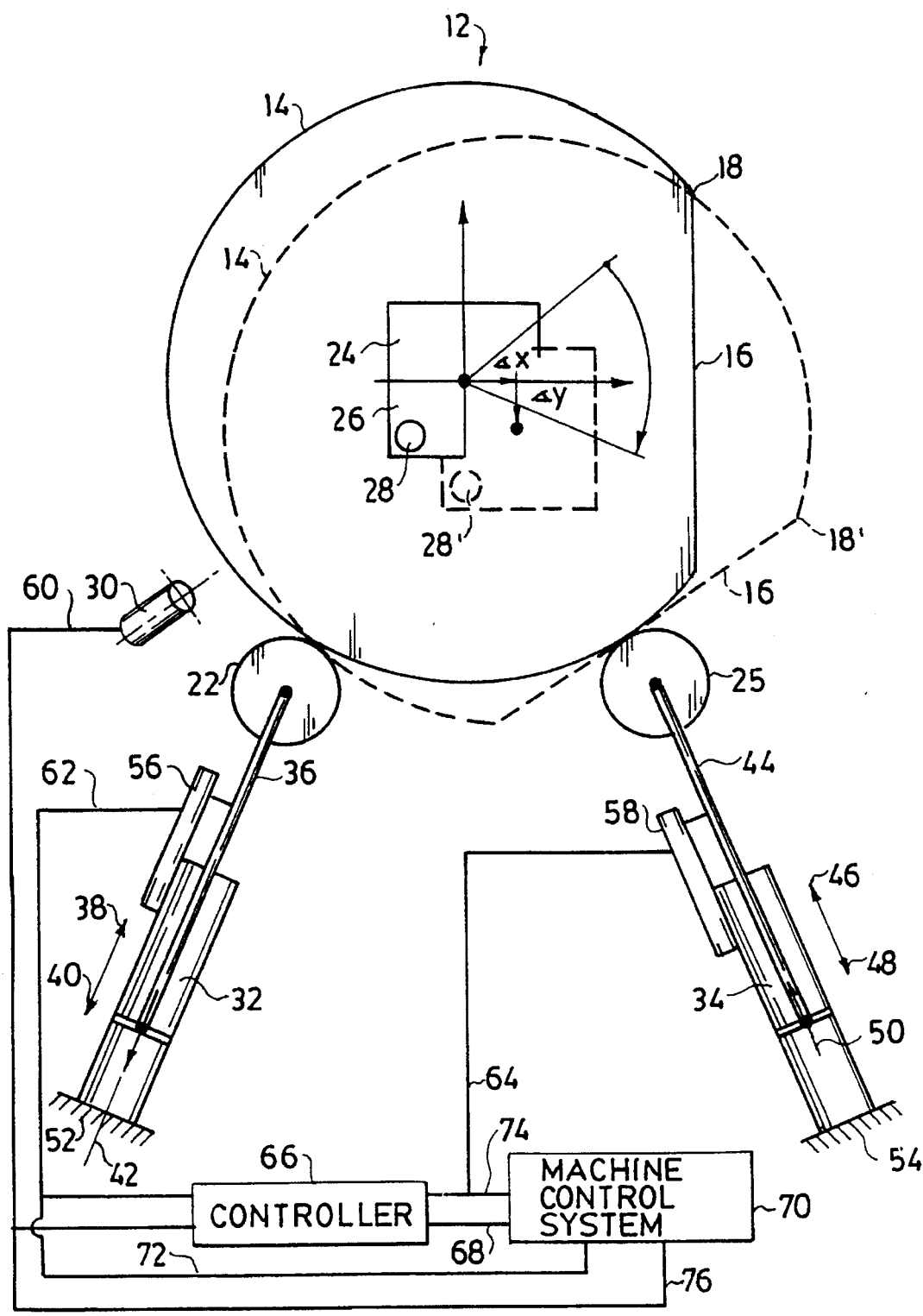
FIG. 1 is a schematic representation of one preferred embodiment of the invention.

FIG. 1 is a schematic representation of one preferred embodiment 10 of applicants' apparatus for measuring a wheel. The preferred embodiment depicted in FIG. 1 allows one to determine the permanent location of the axle center of a wheelset in its center of rotation in both vertical and horizontal directions during the rotary rotation of the wheelset. As used in this specification, the term "permanent location of wheelset" refers to the location in the vertical as well as in the horizontal directions (x and y axes), in the plane orthogonally to the center of rotation, and in a horizontal direction (z) which is parallel to the wheelset axle.

In the process of the invention, which preferably utilizes the apparatus of FIG. 1, at least one measuring point is determined with allocated reference to the center of rotation of the wheelset. This measuring point is preferably arranged torsionally stiff with regard to the wheelset but is slidable in both the x and y axes. An accelerometer measuring in at least two axes can be used as both a measuring point and encoder.

The present invention provides an efficient process, and apparatus, for use in measuring wheels and/or wheelsets of rail vehicles. The term wheelset, as used herein, refers to any kind of wheelset such as, e.g., a single-wheel suspension in a truck. Thus, e.g., the measuring device of this invention may be used with the wheelsets disclosed in U.S. Pat. Nos. 5,349,862 (railway wheelset), 5,335,602 (two wheelset units containing a drive unit and a brake unit), 5,282,425 (a steerable truck with a pair of wheelsets supporting a pair of laterally spaced side frames), U.S. Pat. Nos. 5,263,420 (three driven wheelsets elastically supported in a frame), 5,044,458 (selectively engageable wheelset), 4,895,408 (truck wheelset), 4,802,418 (wheelset steering apparatus), 4,674,370, 4,445,439 (railroad vehicle truck with single wheelset), 4,445,439, 4,444,121, 4,424,750, 4,230,043, and the like. The disclosure of each of these United States patents is hereby incorporated by reference into this specification.

In general, the apparatus of this invention may be used with the wheels or wheelsets of any railroad rolling stock. Thus, e.g., it may be used with one or more of the wheels of locomotives which are described in U.S. Pat. Nos. 3,902,577 (locomotive four wheel truck), 3,982,164, 3,997,822, 4,065,975, 4,276,793 (apparatus for truing the metal wheel of a railroad locomotive), 4,896,090, 4,924,395, 4,950,964, and the like. The disclosure of each of these United States patent applications is hereby incorporated by reference into this specification.

Referring again to FIG. 1, and to the preferred apparatus depicted therein, it will be seen that wheel 12 is depicted with an arcuate surface 14 and a flat surface 16 at one point 18 in its rotation. As will be apparent to those skilled in the art, the apparatus 10 depicted in FIG. 1 is rotating wheel 12 clockwise in the direction of arrow 20. The dotted line depicts wheel 12 after it has been rotated from point 18 to point 18'.

In each of the solid and dotted-line depictions of wheel 12, a large flat surface 16 is depicted. It will be realized by those skilled in the art that the actual flat portions 16 of wheel 12 will frequently be substantially smaller than that depicted in FIG. 1 but that the extent of flat surface 16 has been exaggerated for the sake of simplicity of representation and explanation.

Although a wheel flat surface 16 is depicted in FIG. 1, it will be appreciated by those skilled in the art, alternatively, or additionally, other wheel defects (such as warps, form errors, concentricity errors, and the like) may be detected by the device of this invention, even when more than one of such defects is simultaneously moving across the rollers 22 and 24 of the device.

Referring again to FIG. 1, and in one preferred process, the wheel 12 is preferably located firmly in a measuring or truing machine (not shown). Such machines, although not part of the invention, are well known. Reference may be had to U.S. Pat. No. 4,276,793 (which discloses an apparatus for truing a metal wheel of a railroad locomotive), U.S. Pat. Nos. 4,585,046, 4,825,737, 5,243,765, 4,045,852, 4,014,139, 3,789,475, 3,598,017, and the like. The disclosure of each of these United States patents is hereby incorporated by reference into this specification.

Wheel 12, in all of its positions, is supported by first roller 22 and second roller 25. It is connected to, and rotates within, axle box 24 which comprises axle box face 26.

An accessible measuring point (not shown) on face 26 of axle box 24 is chosen to affix a measuring marker 28. As wheel 12 rotates from position 18 to position 18', the axle box 24 also moves so that the measuring marker 28 moves to position 28'. The extent to which the axle box 24 moves in the x axis (its horizontal offset), and in the y axis (its vertical offset) are preferably detected by a stationary encoder 30, preferably in a non-contact manner.

One may use any conventional measuring marker 28. Thus, by way of illustration and not limitation, one may use one or more of the laser markers disclosed in U.S. Pat. Nos. 5,367,779, 5,130,641, 5,155,499, 5,138,397, 3,815,420, and the like. The disclosure of each of these United States patents is hereby incorporated by reference into this specification.

In one preferred embodiment, encoder 30 is comprised of an optical sensor. Thus, by way of illustration and not limitation, and in this embodiment, one may use the optical sensors described in U.S. Pat. Nos. 5,334,249, 5,267,654, 5,199,176, 5,129,606 (railway wheel sensors), and the like; the entire disclosure of each of these United States patents is hereby incorporated by reference into this specification.

In one preferred embodiment, encoder 30 is an accelerometer adapted to measure position and movement of a marker along at least two (and preferably at least three) mutually orthogonal axes. Thus, by way of illustration and not limitation, one may use one or more of the accelerometers disclosed in U.S. Pat. Nos. 5,374,105, 5,373,776 (two axis accelerometer), 5,357,803, 5,342,404 (an accelerometer which measures position and movement along three mutually orthogonal axes), U.S. Pat. Nos. 5,341,682, 5,322,144, 5,313,835 (three axes accelerometer), U.S. Pat. Nos. 5,294,757, 5,227,929, 5,224,380 (six axes accelerometer), 5,207,099, and the like. The disclosure of each of these United States patents is hereby incorporated by reference into this specification.

In one embodiment, encoder 30 is an accelerometer which is disposed in the plane orthogonal to the center of rotation of wheel 12 with double integration and internal or external signal processing. In this embodiment, it is preferred that the accelerometer be disposed at axle box case 24, or at another reference part of the wheel 12 or wheelset.

In addition to measuring the extent to which the irregularities in wheel 12 cause movement of axle box 24, applicants' measuring apparatus also measures the extent to which wheels 22 and 25 are caused to move by such irregularities. With this information, and other information available to the system, the centerline of the wheelset can readily be determined.

Referring again to FIG. 1, and in the preferred embodiment depicted therein, it will be seen that wheel 12 is supported by means of rollers 22 and 25 which, in turn, are operatively connected to lifting devices 32 and 34.

The term roller, as used in this specification, refers to a cylindrical device for transmitting motion and force by rotation; and it includes, e.g., friction rollers, supporting rollers, axial guiding rollers, combinations thereof, and the like.

In another embodiment, not shown, each of rollers 22 and 25 is replaced by a roller pairs (not shown) tiltably arranged in a roller pair housing (not shown). Conventional roller pairs may be used in this embodiment. Thus, by way of illustration and not limitation, one may use one or more of the rollers pairs disclosed in U.S. Pat. Nos. 5,370,012, 5,362,041, 5,341,733, 5,329,848, 5,318,286, 5,315,323, 5,313,689, 5,256,216, 5,256,022, 5,209,939, 5,195,736, 5,193,800, 5,191,383, 5,187,531, 5,186,336, 5,154,321, 5,152,521, 5,147,092, 5,087,025 (movable roller pair), U.S. Pat. No. 5,525,897 (variable roller pair spacing), and the like. The disclosure of each of these United States patents is hereby incorporated by reference into this specification. In the remainder of this specification, reference will be made to individual movable rollers 22 and 24, it being understood that one or both of such rollers 22 and 24 may be replaced by rollers pairs.

Traversing device 32 is connected to roller 22 by conventional means (such as, e.g., by rod 36) and is adapted to move roller 22 in the directions of arrows 38 and 40 on traversing axis 42. Traversing device 34 is connected to roller 24 by conventional means (such as, e.g., by rod 44) and is adapted to move roller 24 in the direction of arrows 46 and 48 on traversing axis 50. The traversing axes 42 and 50 are preferably chosen in accordance with the available space for underfloor machining of wheel 12. Thus, in the embodiment illustrated in FIG. 1, lifting device 32 is mounted on tread point 52, and lifting device 34 is mounted on tread point 54.

A conventional traversing means may be used as traversing devices 32 and 34. In the preferred embodiment illustrated in FIG. 1, traversing devices 32 and 34 are each preferably hydraulically actuated cylinders.

Thus, by way of illustration, one may use one or more of the hydraulic cylinder/roller arrangements disclosed in U.S. Pat. Nos. 5,347,897 (hydraulic cylinder connected to guide roller), 5,211,108 (hydraulic cylinder connected to vertically adjustable press roller), 5,190,409 (hydraulic cylinder connected to roller support arm), 5,136,891 (hydraulic cylinder connected to roller pair apparatus), and the like. The disclosure of each of these United States patents is hereby incorporated by reference into this specification.

Referring again to FIG. 1, and in the preferred embodiment depicted therein, it will be seen that the movement of each lifting device 32 and lifting device 34, in either direction, is monitored by position encoders 56 and 58, respectively. These position encoders are capable of determining, at any point in the cycle of rotating wheel 12, the distance between fixed treads 52 and 54 and the peripheral surface (either surface 14 and/or surface 16, in the embodiment of FIG. 1) of wheel 12 at its point of tangency with either roller 22 or roller 25.

One may use any of the position encoders known to those skilled in the art as position encoders 56 and 58. Thus, by way of illustration and not limitation, one may use one or more of the position encoders described in U.S. Pat. Nos. 5,367,236, 5,339,194, 5,336,884, 5,331,232, 5,298,206, 5,283,682, 5,274,229 (absolute position encoder), 5,262,937, 5,260,568 (absolute position encoder), 5,257,024 (search position encoder), 5,241,172 (variable pitch position encoder), 5,240,334 (two dimensional position encoder), 5,229,760, 5,220,260, 5,173,693, 5,170,708, 5,155,499, 5,134,471, 5,131,816 (shaft mounted position encoder), 5,126,948 (digital position encoder), 5,121,116, 5,117,374 (reciprocating element position encoder), 5,115,239, 5,107,107, 5,086,641, 5,084,791, 5,064,031, 5,049,879, 5,039,925, 5,036,468, 5,013,988, 4,998,105, 4,971,442 (photoelectric position encoder), 4,879,510 (optical position encoder), 4,733,069 (position encoder using a laser scan beam), 4,730,110 (shaft position encoder), 4,703,106 (optical position encoder), 4,646,085 (shaft position encoder), 4,584,472 (linear position encoder), 4,442,351 (optoelectronic position encoder), 4,194,184 (bidirectional digital position encoder), 4,171,522 (angular position encoder), 4,086,519 (shaft angle position encoder), 3,860,754 (light beam position encoder), 3,778,833 (magnetic-electronic position encoder), 3,775,560 (infrared light beam x–y position encoder), 3,491,244 (radiation sensitive position encoder), and the like. The disclosure of each of these United States patents is hereby incorporated by reference into this specification.

Referring again to FIG. 1, and in the preferred embodiment depicted therein, it is preferred that encoder 30 be adapted to measure the position of marker 28 in at least the x axis and the y axis and that said encoder 30 preferably be arranged in a plane substantially orthogonal to the center of rotation of wheel 12.

In one preferred embodiment, either or both of encoders 58 and/or 58 is an angular position encoder such as, e.g., the electronic angular position encoder disclosed in U.S. Pat. No. 4,171,522.

In another preferred embodiment, either or both of encoders 56 and/or 58 is an accelerometer measuring in two directions in the plane orthogonally to the center of rotation of wheel 12 with double integration and internal or external signal processing. In this embodiment, the accelerometer is arranged at an axle box case or another reference part of the wheelset.

In another preferred embodiment, either or both of encoders 56 and/or 58 are non-contact encoders with non-contact data transmission.

In the embodiment illustrated in FIG. 1, one encoder 30 measuring in at least two directions is depicted. Alternatively, one may use two or more encoders 30 (not shown), each measuring in one direction.

It will thus be apparent to those skilled in the art that, with the apparatus 10 of FIG. 1, (1) the diameters of rollers 22 and 25 are known, (2) the positions of lifting devices 32 and 34 are known by means of position encoders 56 and 58, and thus, (3) the distances between fixed treads 52 and 54 and the periphery of the measured wheelset 12 at the point of its tangency with rollers 22 and 24 are known, and (4) the extent to which the chosen measuring point moves in the x and y axes during the rotation of wheelset 12 is also known.

Referring again to FIG. 1, information from encoder 30, position encoder 56, and position encoder 58 may be fed via data links 60, 62, and 64 to controller 66.

Any conventional means for transmitting data to and from encoder 30 and/or encoder 54 and/or encoder 56 may be used as data links 60, 62, and 64. Thus, e.g., one may use one or more of the data links disclosed in U.S. Pat. Nos. 5,373,651, 5,365,436, 5,363,402, 5,362,014 (fiber optical data link), 5,323,667 (data link for tractor), 5,321,542 (wireless data link), 5,172,314 (serial data link), 5,140,610 (frequency modulated video data link), 4,714,925, 4,602,331, 4,494,238 (multiple channel data link), 4,464,748 (remote data link), 4,292,800, 4,213,199 (acoustic data link), 3,590,250, and the like. The disclosure of each of these United States patents is hereby incorporated by reference into this specification.

As will be apparent to those skilled in the art, the extent to which roller 22, or roller 25, has to be moved by either lifting device 32 and 34 in order to keep it contiguous with the periphery of wheel 12 during any portion of the cycle of rotation of wheel 12 will be a function of both the change in the x axis and the y axis of marker 28; and this can readily and continuously be calculated by controller 66.

The controller 66 instantaneously determines the extent to which the measuring point has moved in the x direction ("delta x"), and the extent to which the measuring point has moved in the y direction ("delta y"); and it calculates the extent to which lifting device 32 must move ("delta h1"), and the extent to which lifting device 34 ("delta h2") must move.

Figure 2:
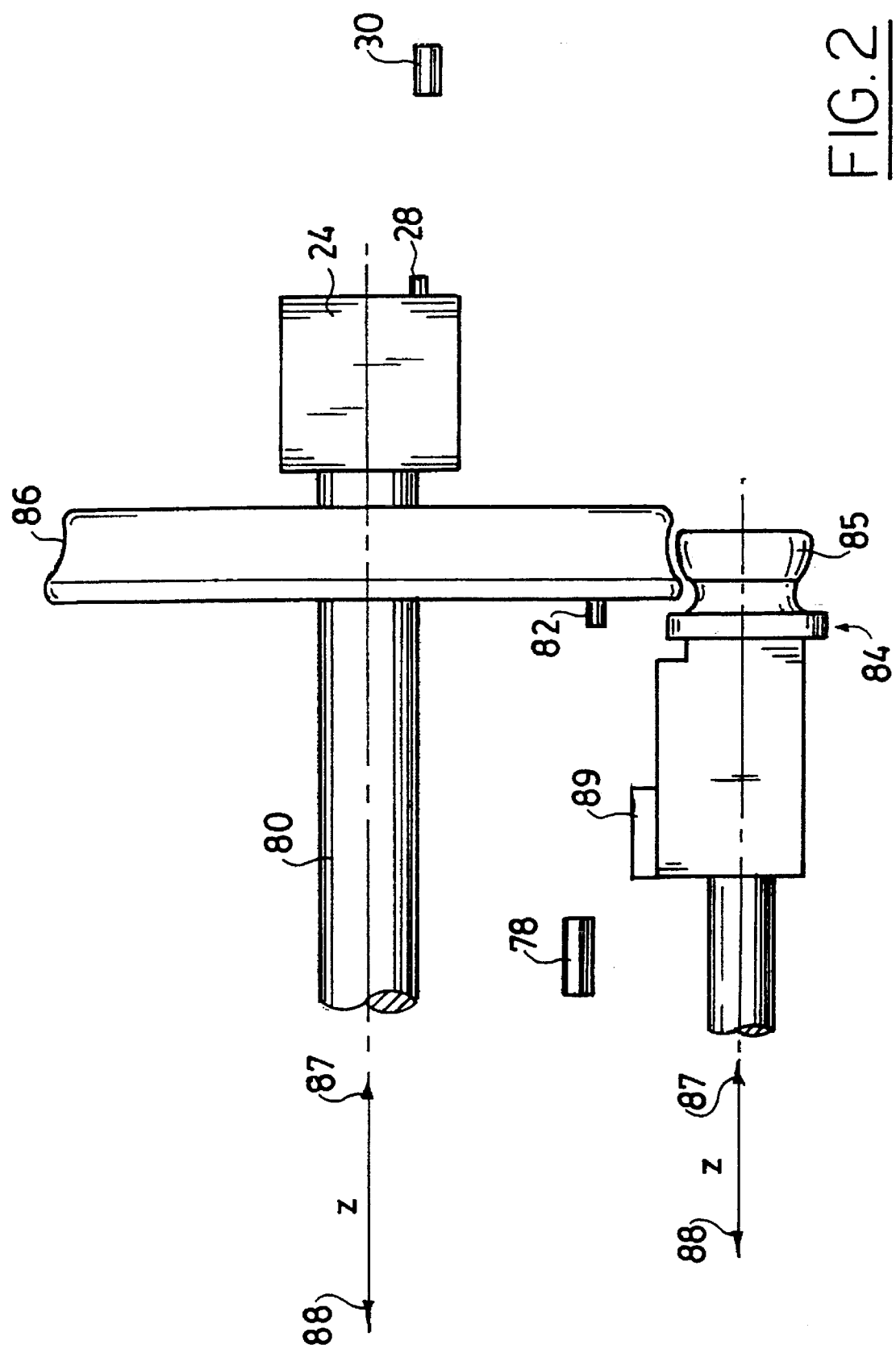
FIG. 2 is a partial schematic representation of another preferred embodiment of the invention.

Referring again to FIG. 1, information from controller 66 is passed via line 68 to machine control system 70, which is electrically connected via lines or data links to position encoder 56 (via lines or data links 72 and 62), to position encoder 58 (via lines or data links 74 and 64), to encoder 30 (via lines or data links 76 and 60), and to encoder 78 (not shown in FIG. 1, but see FIG. 2).

Machine control system 70 may be any conventional system used to control machines. Thus, by way of illustration and not limitation, one may use one or more of the machine control systems disclosed in U.S. Pat. Nos. 5,367,158, 5,358,592, 5,339,249 (control of multi-spindle screw machine), 5,325,733, 5,295,076 (numerical machine control system), 5,246,039 (textile machine control system), 5,216,461 (copying machine control system), 4,819,273 (mining machine control system), 4,628,609 (incremental measuring and machine control system), 4,531,182 (machine control system operating from remote commands), 4,505,074 (grinding machine control system for intermittently measuring workpiece size), 4,364,110 (computerized machine control system), 3,602,090 (milling machine control system), and the like. The disclosure of each of these United States patents is hereby incorporated by reference into this specification.

Referring again to FIG. 1, readjustment of the lifting devices 32 and 34 by travel delta h1 and delta h2 is effected by machine control system 70 irrespectively of each other and in accordance with said determinations and calculations so that the axle center 64 of the wheelset 12 in position 18' is again positioned to the position of axle center 66 (shown in position 18) notwithstanding the wheel flat 16 treading on roller 24. The offsets caused by irregularities in wheel 12 are compensated for via evaluating unit 66 in combination with machine control system 70 and the lifting devices 56 and 58.

FIG. 2 is a partial schematic of a preferred embodiment of the invention illustrating a wheelset 80 mounted in a railroad vehicle (not shown). This wheelset 80 is preferably aligned and centered, or brought into a position, in a wheelset truing machine (not shown).

Referring to FIG. 2, it will be seen the wheelset 80 is disposed in direction z and contiguous with roller assembly 84 so that, during the rotation wheel 12, irregularities in the rear face 86 of wheel 12 causes motion in the directions of arrows 87 and 88; wheel 85 of roller assembly 84 is preferably contiguous with wheel 12 and is disposed so that it is approximately perpendicular to the face of the wheel 12. A measuring point (point 28) is preferably arranged at the non-rotating outer part of the box case 24 of the wheelset 80; the measuring point 28 is arranged torsionally stiff with regard to wheelset 80 and stationary encoder 30.

In the embodiment depicted in FIG. 2, an additional marker 82 is disposed and preferably aligned with encoder 78. Although only one such marker 82 is depicted in FIG. 2, it will be apparent that a multiplicity of such markers can be used.

Referring again to FIG. 2, it will be seen that it is advisable to arrange the measuring point for direction z at the inner end face of wheel 12.

One can use any conventional encoder/marker system commonly used for measuring the distance of a rotating wheel from a fixed point. Thus, by way of illustration and not limitation, one may use one or more of the encoders disclosed in U.S. Pat. Nos. 5,317,812 (measuring wheel operatively connected to an encoder), 5,317,149 (optical encoder), 5,301,427 (encoder wheel), 5,219,660 (rotary encoder), 5,282,382 (encoder wheel), 5,274,229 (absolute position encoder), 5,259,562 (wheel shaft encoder), 5,257,458 (rotary encoder), 5,252,967 (wheel position encoder), 5,248,939 (encoder mounted on a wheel), 5,243,338 (wheel position encoder), 5,241,172 (optical encoder), 5,231,391 (rotating encoder element), 5,223,706, 5,201,224, 5,175,498 (digital rotary shaft encoder), 5,175,415 (encoder wheel), 5,123,496 (absolute value rotary encoder), 5,013,910 (shaft angle encoder), 4,643,425 (optical encoder for sensing the position of a marker on a wheel), and the like. The entire disclosure of each of these United States patents is hereby incorporated by reference into this specification.

It is preferred that encoder 78 comprise a receptor which is operatively connected to encoder 78, which is then able to determine at what point in any particular cycle the wheel 12 is at (e.g., at the marker, 90 degrees from the marker, etc.), and, additionally, the distance between the wheel 12 and the encoder 78 at any such particular point to determine, at any point in any particular cycle of rotation, to what extent, if any, measuring wheel 20 is displaced from its normal position.

Roller assembly 84 is preferably comprised of a traversing device 87 adapted to move roller 85 in the direction of arrow 86 and/or arrow 88. The traversing device 87, encoder 78, and encoder 30 are preferably operatively connected to controller 66 and machine control system 78, but these features have been omitted from FIG. 2 for the sake of simplicity of representation.

In one preferred process of this invention, the size between the tool and the center of rotation of the wheelset is preferably permanently stabilized when truing the wheel profile without clearing the center bores and without application of any constrained forces, and the position-of the end face of the wheel is located axially. To this end, a measuring point is respectively defined with allocated reference to the center of rotation held in directions irrespective of each other (x, y, z) by means of position control, which is effected by means of rollers 22 and 25 and their associated lifting devices.

In one preferred embodiment, described with respect to FIG. 2, three measuring points are preferably defined at one end face.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for locating the center of rotation of a wheelset comprised of a wheel arranged to turn about an axis of rotation mounted thru the area of the wheel geometric center, wherein said apparatus is comprised of:

(a) a first movable roller assembly designed for establishing circumferential contact with the wheel at a first location on the wheel periphery;

(b) a first lifting device operatively connected to said first movable roller assembly and adapted to move said first movable roller assembly in a linear direction towards or away from the wheel geometric center;

(c) first encoder means for detecting the movement of said first movable roller assembly;

(d) a second movable roller assembly designed for establishing circumferential contact with the wheel at a second location on the wheel periphery;

(e) a second lifting device operatively connected to said second movable roller assembly and adapted to move said second movable roller assembly in a linear direction towards or away from the wheel geometric center;

(f) second encoder means for detecting the movement of said second movable roller assembly;

(g) means for determining the extent to which said wheelset moves in the x axis during rotation of said wheel about said axis of rotation;

(h) means for determining the extent to which said wheelset moves in the y axis during rotation of said wheel about said axis of rotation; and (i) a machine control system comprised of a controller, wherein said controller is operatively connected to said first encoder means, said second encoder means, said means for determining the extent to which said wheelset moves in the x axis, said means for determining the extent to which said wheelset moves in the y axis, said first lifting device and said second lifting device.

2. The apparatus as recited in claim 1, wherein said first movable roller assembly is comprised of a first roller.

3. The apparatus as recited in claim 2, wherein said second movable roller assembly is comprised of a second roller.

4. The apparatus as recited in claim 3, wherein each of said first movable roller assembly and said second movable roller assembly is comprised of a roller pair disposed within a roller pair housing.

5. The apparatus as recited in claim 1, wherein said first encoder means is comprised of a position encoder.

6. The apparatus as recited in claim 1, wherein said position encoder is an angular position encoder.

7. The apparatus as recited in claim 1, wherein said wheelset is comprised of an axle box case disposed thru the rotational center of said wheel to define a wheelset axial centerline for said wheel, and wherein said means for determining the extent to which said wheelset moves in the x axis during rotation of said wheel is comprised of an accelerometer adapted to measure in two directions in the plane orthogonal to the center of rotation of said wheel.

8. The apparatus as recited in claim 1, wherein said means for determining the extent to which said wheelset moves in the x axis during rotation of said wheel is a non-contact encoder.

9. The apparatus as recited in claim 1, wherein said apparatus further comprises means for aligning said wheelset.

10. The apparatus as recited in claim 1, wherein said apparatus further comprises additional means for measuring said wheelset.

11. The apparatus as recited in claim 1, wherein said apparatus further comprises means for determining the extent to which said wheelset moves in the z axis during rotation of said wheel.

12. The apparatus as recited in claim 11, wherein said wheelset is comprised of an axle box case disposed thru the rotational center of said wheel to define a wheelset axial centerline for said wheel, and said apparatus is further comprised of a first marker disposed on said axle box case.

13. The apparatus as recited in claim 12, wherein said apparatus is comprised of a second marker disposed on an external face of said wheel.

14. The apparatus as recited in claim 13, wherein said apparatus is comprised of third encoder means for monitoring the position of said second marker on said wheel.

15. A process for locating the center of rotation of a wheelset comprised of a wheel arranged to turn about an axis of rotation mounted thru the area of the wheel geometric center, and an axle box case disposed thru the rotational center of said wheel to define a wheelset axial centerline for said wheel, comprising the steps of:

(a) rotating said wheel of said wheelset while contacting said wheel with a first movable roller assembly and a second movable roller assembly of a measuring apparatus where said first and second roller assemblies are placed at two tangential points along the circumference of said wheel periphery, (b) moving said first movable roller assembly in a linear direction towards or away from said axle box case during the rotation of said wheel to maintain contact of said first movable roller assembly with the periphery of said wheel, (c) moving said second movable roller assembly in a linear direction towards or away from said axle box case during the rotation of said wheel to maintain contact of said second movable roller assembly with the periphery of said wheel, (d) determining the extent to which said first movable roller assembly moves in a linear direction during rotation of said wheel, (e) determining the extent to which said second movable roller assembly moves in a linear direction during rotation of said wheel, (f) moving said wheelset box in the x axis during rotation of said wheel, (g) moving said wheelset in the y axis during rotation of said wheel, (h) determining the extent to which said wheelset moves in said x axis during the rotation of said wheel, and (i) determining the extent to which said wheelset moves in said y axis during the rotation of said wheel.

16. The process as recited in claim 15, wherein said measuring apparatus is comprised of:

(a) a first movable roller assembly designed for establishing circumferential contact with the wheel at a first location on the wheel periphery;

(b) a first lifting device operatively connected to said first movable roller assembly and adapted to move said first movable roller assembly in a linear direction towards or away from the wheel geometric center;

(c) first encoder means for detecting the movement of said first movable roller assembly;

(d) a second movable roller assembly designed for establishing circumferential contact with the wheel at a second location on the wheel periphery;

(e) a second lifting device operatively connected to said second movable roller assembly and adapted to move said second movable roller assembly in a linear direction towards or away from the wheel geometric center;

(f) second encoder means, for detecting the movement of said second movable roller assembly;

(g) means for determining the extent to which said wheelset moves in the x axis during rotation of said wheel about said axis of rotation;

(h) means for determining the extent to which said wheelset moves in the y axis during rotation of said wheel about said axis of rotation; and (i) a machine control system comprised of a controller, wherein said controller is operatively connected to said first encoder means, said second encoder means, said means for determining the extent to which said wheelset moves in the x axis, said means for determining the extent to which said wheelset moves in the y axis, said first lifting device and said second lifting device.

* * * * *